(12) United States Patent
Kawai

(10) Patent No.: US 10,088,828 B2
(45) Date of Patent: Oct. 2, 2018

(54) CONTROLLING LOAD RATIO INDUCED SHUT-DOWN CONDITIONS IN NUMERICAL CONTROL DEVICES

(71) Applicant: OKUMA Corporation, Niwa-gun, Aichi (JP)

(72) Inventor: Yoichi Kawai, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 291 days.

(21) Appl. No.: 14/919,040

(22) Filed: Oct. 21, 2015

(65) Prior Publication Data

US 2016/0116900 A1   Apr. 28, 2016

(30) Foreign Application Priority Data

Oct. 24, 2014   (JP) ................................ 2014-217374

(51) Int. Cl.
*G05B 19/406* (2006.01)

(52) U.S. Cl.
CPC .. *G05B 19/406* (2013.01); *G05B 2219/37429* (2013.01)

(58) Field of Classification Search
CPC .................... G05B 19/406; G05B 2219/37429
See application file for complete search history.

(56) References Cited

U.S. PATENT DOCUMENTS

| | | | | |
|---|---|---|---|---|
| 3,686,911 A * | 8/1972 | Plagemann | ............ | B21H 3/00 72/108 |
| 4,034,276 A * | 7/1977 | Hyatt | ................ | B60R 16/0373 318/608 |
| 4,179,732 A * | 12/1979 | Khan | .................... | G06K 15/08 358/1.16 |
| 4,282,583 A * | 8/1981 | Khan | .................... | G06K 15/08 358/1.5 |
| 4,456,867 A * | 6/1984 | Mallick, Jr. | .............. | H02P 1/26 318/778 |
| 4,467,260 A * | 8/1984 | Mallick, Jr. | ........... | H02H 6/005 318/434 |

(Continued)

FOREIGN PATENT DOCUMENTS

| | | | |
|---|---|---|---|
| JP | 63150137 A | | 6/1988 |
| JP | 06253577 A | | 9/1994 |

(Continued)

OTHER PUBLICATIONS

JP Notice of Grounds for Rejection corresponding to Application No. 2014-217374; dated Jun. 5, 2018.

*Primary Examiner* — Mohammad Ali
*Assistant Examiner* — Kelvin Booker
(74) *Attorney, Agent, or Firm* — Cantor Colburn LLP

(57) ABSTRACT

A numerical control device with a function to prevent a problem caused by a rapid stop of a processing operation due to a motor overheating during processing. A temperature comparator obtains a load ratio T/Tmax or Tw/Tmax which is a ratio of the motor temperature T or predicted temperature Tw to a maximum allowable temperature Tmax stored in a storage device. When the load ratio T/Tmax or Tw/Tmax is over a threshold Tp stored in a storage, the device is placed in an alarm mode to shutdown the power supply to the motor after the processing program is executed to the end of a sequence block or the end of the processing program.

8 Claims, 2 Drawing Sheets

(56) References Cited

U.S. PATENT DOCUMENTS

| | | | | |
|---|---|---|---|---|
| 4,506,321 A | * | 3/1985 | Comstock | G05B 19/232 318/561 |
| 4,742,855 A | * | 5/1988 | Hartley | B23Q 5/10 144/154.5 |
| 4,852,434 A | * | 8/1989 | Bald | B23B 23/00 279/135 |
| 5,223,775 A | * | 6/1993 | Mongeau | H02P 6/10 318/400.38 |
| 5,281,901 A | * | 1/1994 | Yardley | G05D 1/0265 180/167 |
| 5,608,657 A | * | 3/1997 | Conway | G05B 23/0205 700/79 |
| 5,650,703 A | * | 7/1997 | Yardley | G05D 1/0265 180/167 |
| 5,730,643 A | * | 3/1998 | Bartlett | B23Q 11/08 451/11 |
| 5,780,989 A | * | 7/1998 | Matsumoto | H02P 23/16 318/568.22 |
| 6,064,172 A | * | 5/2000 | Kuznetsov | G01R 31/346 318/434 |
| 6,208,497 B1 | * | 3/2001 | Seale | F01L 9/04 361/154 |
| 6,291,959 B1 | | 9/2001 | Yoshida et al. | |
| 6,613,253 B1 | * | 9/2003 | Negishi | B26D 1/0006 264/345 |
| 9,328,915 B2 | * | 5/2016 | Vanko | F21V 33/0084 |
| 2001/0043450 A1 | * | 11/2001 | Seale | F01L 9/04 361/160 |
| 2002/0063542 A1 | * | 5/2002 | Takahashi | H02P 27/08 318/432 |
| 2002/0144641 A1 | * | 10/2002 | Inagaki | C30B 15/14 117/13 |
| 2003/0163296 A1 | * | 8/2003 | Richards | G06F 17/5036 703/14 |
| 2005/0073279 A1 | * | 4/2005 | Fenley | B60K 6/26 318/717 |
| 2008/0054833 A1 | | 3/2008 | Ando et al. | |
| 2010/0076612 A1 | * | 3/2010 | Robertson | H02M 5/4505 700/286 |
| 2013/0201316 A1 | * | 8/2013 | Binder | H04L 67/12 348/77 |
| 2013/0327552 A1 | * | 12/2013 | Lovelass | B25F 5/00 173/1 |
| 2013/0331994 A1 | * | 12/2013 | Ng et al. | B25B 23/147 700/275 |
| 2014/0284070 A1 | * | 9/2014 | Ng | B25F 5/00 173/2 |
| 2014/0334945 A1 | * | 11/2014 | Koehl | F04D 15/0088 417/44.11 |
| 2015/0041164 A1 | * | 2/2015 | Sergyeyenko | B25B 21/008 173/1 |

FOREIGN PATENT DOCUMENTS

| | | |
|---|---|---|
| JP | 08263113 A | 10/1996 |
| JP | 09261850 A | 10/1997 |
| JP | 2000271839 | 10/2000 |
| JP | 2008061302 A | 3/2008 |

\* cited by examiner

CONTROLLING LOAD RATIO INDUCED SHUT-DOWN CONDITIONS IN NUMERICAL CONTROL DEVICES

PRIORITY INFORMATION

The present invention claims priority under 35 U.S.C. § 119 to Japanese Application No. 2014-217374 filed on Oct. 24, 2014, the entire content of which is incorporated herein by reference.

BACKGROUND

Technical Field

The present invention relates to a numerical control device and a method for monitoring a temperature rise of a motor to perform overload shutdown.

Related Art

If a motor continues operation in an overload condition, the temperature of motor winding rises to eventually cause winding burnout. Thus, in conventional numerical control devices, a temperature sensor such as a thermistor is embedded in a motor winding such that when the temperature rises over the maximum allowable temperature, an alarm is issued and the power supply to the motor is shutdown.

As an alternative to the above temperature sensing method using a temperature sensor, an electronic thermal system has also been used to calculate the temperature of the motor winding so as to place the device into an alarm mode and shutdown the power supply to the motor when the temperature rises over the maximum allowable temperature. In the electronic thermal system, a motor temperature is obtained by calculating the amount of heat generation and heat discharge based on a current command value, history of electric current sensed values, or the like (refer to JP H09-261850 A, JP H06-253577 A, and JP 2008-61302 A).

With reference to FIG. 2, a conventional numerical control device is described below. FIG. 2 is a block diagram showing a typical control block of a conventional numerical control device.

First, an NC command generator 1 analyzes a processing program, generates a positional command P* by applying processes such as an interpolation process and an acceleration/deceleration process to the analysis results, and sends the generated positional command P* to a position controller 2. The position controller 2 receives inputs of the positional command P* and a positional feedback P from an encoder 7, and calculates a speed command V* by applying calculation such as proportional (P) control to these inputs. A speed controller 3 receives inputs of the speed command V* calculated above by the position controller 2 and a speed feedback V from the encoder 7. The speed controller 3 applies calculation such as proportional-integral (PI) control to these inputs to calculate a current command I*. A current controller 4 receives inputs of the current command I* and a current feedback I, and calculates an inverter drive command based on these inputs. An inverter circuit 5 operates a motor 6 by applying electric current to the motor 6 in accordance with the inverter drive command. In the case of speed control such as for a main shaft, a speed command V1* (not the positional command P*) is directly sent to the speed controller 3 from the NC command generator 1.

As the temperature of the motor 6, a motor temperature T (output from a temperature sensor disposed with a winding of the motor 6) or a motor temperature TW (calculated using the electronic thermal system as disclosed in JP H09-261850 A by inputting the current command I* or a current feedback I to a temperature predictor 8) is used.

The motor temperature T or the motor temperature TW is input to a temperature comparator 9 for comparison with the maximum allowable temperature Tmax stored in advance in a storage 10. When Tmax≤T or TW, the temperature comparator 9 sends a power supply shutdown command to the current controller 4 to shutdown the power supply to the motor and place the numerical control device in the alarm mode.

SUMMARY

For example, in a machine tool (machining center) mounted with a conventional numerical control device, a workpiece on a moving table is processed by driving the table on which the workpiece is placed and turning a tool mounted on a main shaft. There is a problem that when the temperature of the winding of a feed shaft motor which drives the table rises over the maximum allowable temperature during processing and the power supply to the feed shaft motor or a main shaft motor is shutdown, because the motor and the table cannot immediately stop due to the inertia, the table continues moving such that the tool cuts into the workpiece, causing damage to the workpiece and the machine body. In order to prevent such damage, the power supply may be controlled to be shut down after stopping all the motors. However, in such a case, there remains a problem that a tool cuts into the workpiece when the tool is stopped during processing. Further, there is another problem that when the motor temperature drops and the processing restarts, because the temperature of the machine changes due to the elapsed time from the stop to the restart, unevenness is formed on the workpiece at the processed portion due to the temperature change of the machine, resulting in a workpiece that is unusable as a product.

When the power supply to the motor is shutdown due to the temperature of the motor winding being over the maximum allowable temperature not during processing, the workpiece and the machine are not damaged. However, when such a problem occurs, for example, at night when a machine tool in a process line machine is in unattended operation, even if the workpiece or the machine body are not damaged, there remains a problem that because the machine is not in operation until the operation of the machine is resumed the next day, the machine utilization rate drops.

The present invention has an object to solve at least one of the problems.

In order to solve the above problems, a numerical control device according to the present invention includes an NC command generator that outputs a positional command by executing a processing program; a position controller that receives inputs of the positional command and a positional feedback from an encoder sensing a position of a movable element of a motor, obtains a speed command based on the received inputs, and outputs the speed command; a speed controller that receives inputs of the speed command and a speed feedback from the encoder, obtains a current command based on the received inputs, and outputs the current command; a current controller that receives inputs of the current command and a current feedback, obtains an inverter drive command based on the received inputs, and outputs the inverter drive command; an inverter circuit that controls the motor in accordance with the inverter drive command; a motor temperature sensor that senses or predicts a temperature of the motor; and a power supply controller that calculates a load ratio that is a ratio of the motor temperature sensed or predicted by the motor temperature sensor to a predetermined maximum motor allowable temperature, and controls to shutdown a power supply to the motor after allowing the NC command generator to execute the processing program to an end of a sequence block or an end of the processing program when the calculated load ratio is over a predetermined threshold.

In another aspect of the present invention, a numerical control device includes an NC command generator that outputs a positional command by executing a processing program; a position controller that receives inputs of the positional command and a positional feedback from an encoder sensing a position of a movable element of a motor, obtains a speed command based on the received inputs, and outputs the speed command; a speed controller that receives inputs of the speed command and a speed feedback from the encoder, obtains a current command based on the received inputs, and outputs the current command; a current controller that receives inputs of the current command and a current feedback, obtains an inverter drive command based on the received inputs, and outputs the inverter drive command; an inverter circuit that controls the motor in accordance with the inverter drive command; a motor temperature sensor that senses or predicts a temperature of the motor; and a cut depth controller that calculates a load ratio that is a ratio of the motor temperature sensed or predicted by the motor temperature sensor to a predetermined maximum motor allowable temperature, and controls to reduce a cut depth commanded by the processing program when the calculated load ratio is over a predetermined threshold.

According to the present invention, a numerical control device automatically shuts down a power supply after executing a processing program to the end of a sequence block or the end of the processing program when a load ratio of a motor temperature Tw to a maximum motor allowable temperature Tmax is over a predetermined load ratio (threshold Tp) set in advance. In this way, it becomes possible to solve the problem that a workpiece or a machine body is damaged due to a power supply being shutdown during processing.

According to another aspect of the present invention, a numerical control device automatically reduces a cut depth commanded by the processing program to lower the motor temperature to be equal to or below the threshold Tp by reducing the load during acceleration and deceleration, or the processing load, when a load ratio of a motor temperature Tw to a maximum motor allowable temperature Tmax is over a predetermined load ratio (threshold Tp) set in advance. In this way, because the likelihood of the motor temperature reaching above the maximum allowable temperature can be lowered before the motor becomes overloaded, it becomes possible to increase the likelihood of continuous processing without interrupting the machine operation.

DETAILED DESCRIPTION

Figure 1:
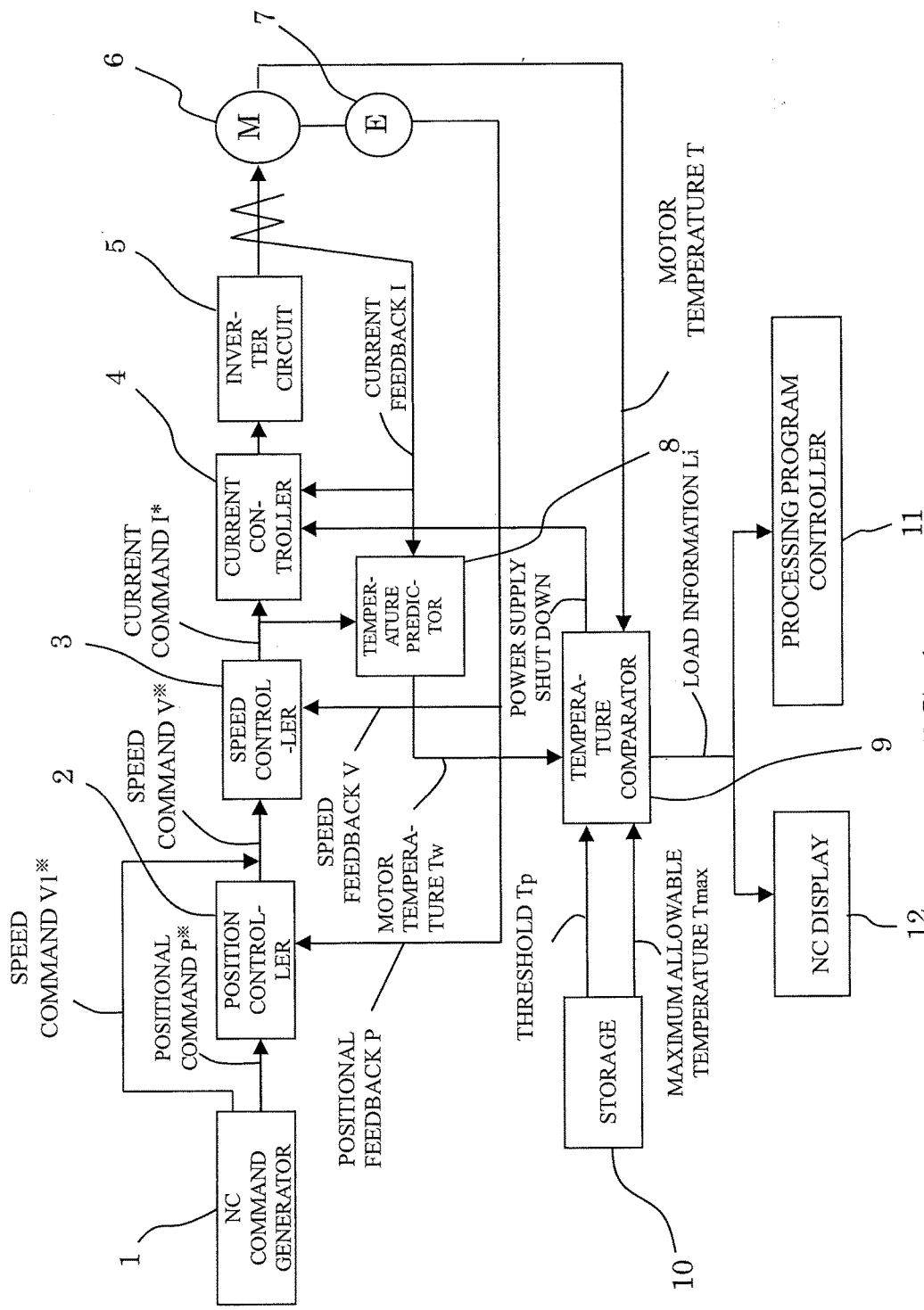
FIG. 1 is a block diagram showing one example of a control block of a numerical control device according to one embodiment of the present invention.
Figure 2:
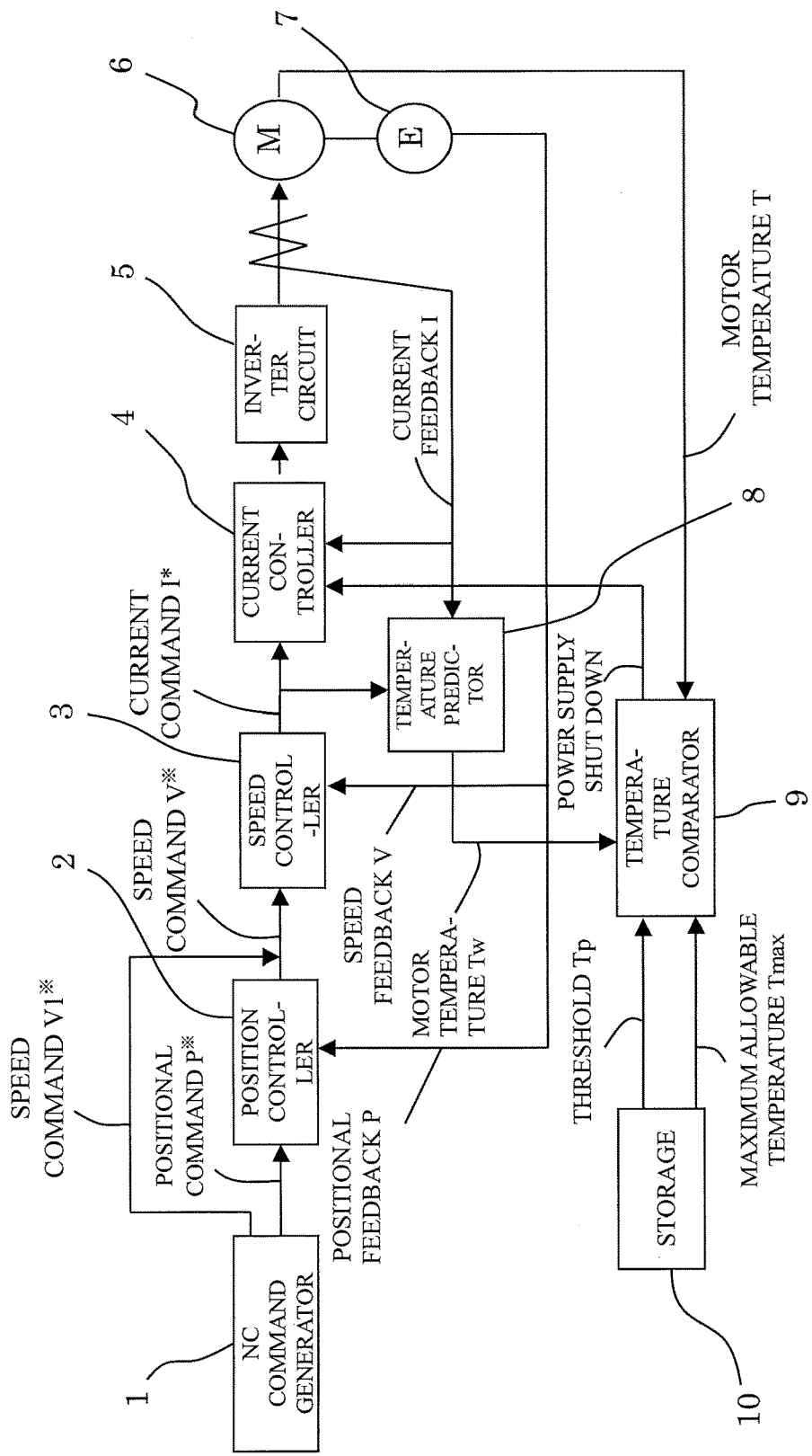
FIG. 2 is a block diagram showing a control block of a conventional numerical control device.

A first embodiment of the present invention is described below with reference to FIG. 1. FIG. 1 is a block diagram showing a control block of a numerical control device according to an embodiment of the present invention. First, the NC command generator 1 analyzes a processing program, generates a positional command P* by applying processes such as an interpolation process and an acceleration/deceleration process to the analysis results, and sends the generated positional command P* to a position controller 2. The position controller 2 receives inputs of the positional command P* and a positional feedback P from an encoder 7, and calculates a speed command V* by applying calculation such as proportional (P) control to these inputs. A speed controller 3 receives inputs of the speed command V* calculated above by the position controller 2 and a speed feedback V from the encoder 7. The speed controller 3 applies calculation such as proportional-integral (PI) control to these inputs to calculate a current command I*. A current controller 4 receives inputs of the current command I* and a current feedback I, and calculates an inverter drive command based on these inputs. An inverter circuit 5 operates a motor 6 by applying electric current to the motor 6 in accordance with the inverter drive command. In the case of speed control of a main shaft, a speed command V1* (not the positional command P*) is directly sent to the speed controller from the NC command generator 1. The speed controller 3 calculates the current command I* based on the speed command V1* and the speed feedback V from the encoder 7.

As the temperature of the motor 6, a motor temperature T (output from a temperature sensor disposed with a winding of the motor 6) or a motor temperature TW (calculated by a temperature predictor 8 using the electronic thermal system based on the current command I* or the current feedback I) is used. The temperature comparator 9 obtains a load ratio T/Tmax (ratio of the motor temperature T to the maximum motor allowable temperature Tmax) or Tw/Tmax (ratio of the motor temperature Tw to the maximum motor allowable temperature Tmax) based on the motor temperature T (output from the temperature sensor) or the motor temperature Tw (predicted by the temperature predictor 8), and the maximum allowable temperature Tmax stored in advance in the storage 10. The temperature comparator 9 further compares the load ratio T/Tmax or Tw/Tmax with a threshold Tp stored in advance in the storage 10 such that when the load ratio T/Tmax or Tw/Tmax is over the threshold Tp, the temperature comparator 9 sends, to a processing program controller 11, load information Li indicating that the motor temperature T or Tw is over the threshold Tp. When the load ratio T/Tmax or Tw/Tmax is equal to or below the threshold Tp, the temperature comparator 9 executes no operation. When receiving the load information Li from the temperature comparator 9, the processing program controller 11 shuts down the power supply to the motor 6 and executes processes to place the numerical control device in the alarm mode after allowing the NC command generator 1 to execute a processing program to the end of a sequence block or the end of the processing program. In this way, it becomes possible to prevent the workpiece or the machine body from being damaged due to the shutdown of the power supply during processing.

The threshold Tp is set to a positive value less than 1. It is preferable to set a smaller threshold Tp when the time period required for one cycle of the processing program is longer. This is to avoid the situation where the power supply to the motor is shut down during processing when the motor temperature reaches the max allowable temperature Tmax and the motor enters the alarm mode before the processing program is finished. Appropriate thresholds Tp for respective time periods of one processing cycle can be determined in advance by tests or in any other manner. It is preferable that the threshold Tp is variably set by an operator in accordance with the length of the processing program.

A second embodiment of the present invention is described below. The configuration of the device of the second embodiment is identical to the embodiment shown in FIG. 1. The second embodiment is identical to the first embodiment except for the points described below.

In the first embodiment, when receiving the load information Li, the processing program controller 11 shuts down the power supply to the motor 6 and executes processes to place the numerical control device in the alarm mode after allowing a processing program to be finished to the end of a sequence block or the end of the processing program.

In contrast, in the second embodiment, when receiving the load information Li, the processing program controller 11 controls such that the cut depth commanded by the processing program is made smaller until the load ratio T/Tmax or Tw/Tmax (the ratio of the motor temperature to the maximum allowable temperature Tmax) becomes equal to or below the threshold Tp. In other words, the processing program controller 11 changes the cut depth per single processing cycle designated in the processing program to a smaller value and instructs the NC command generator 1 to calculate the positional command P* in accordance with the changed cut depth. When the cut depth of the tool (such as a tool bit) per single processing cycle is made smaller, while the number of required processing steps to achieve the designated cut depth increases, the heat generation of the motor becomes smaller because the load of the motor becomes smaller. In this way, it becomes possible to lower the likelihood of the problem that the power supply to the motor is shut down during processing because of the motor temperature rising over the maximum allowable temperature Tmax. For example, by reducing the cut depth to an appropriate value or to an appropriate ratio (with respect to the original value), it becomes possible to prevent the motor temperature from rising over the maximum allowable temperature during processing. In this way, continuous processing without interrupting the machine operation becomes possible. The appropriate value or ratio to reduce the cut depth so as to enable the continuous processing may be obtained in advance by tests or in any other manner. When receiving the load information Li, the processing program controller 11 may also lower the feed speed of the feed shaft during processing, in addition to reducing the cut depth.

The threshold Tp is set to a positive value less than 1. It is preferable to set a smaller threshold Tp when the processing load is higher. This is to avoid the situation where the power supply to the motor is shutdown during processing when the motor temperature reaches the maximum allowable temperature Tmax and the motor enters the alarm mode before the processing is finished. In other words, because the motor temperature more easily reaches the maximum allowable temperature Tmax when the application load is higher, the likelihood of the motor temperature reaching the maximum allowable temperature Tmax can be reduced by starting the control to reduce the cut depth from a lower temperature (threshold Tp). It is preferable that the threshold Tp is variably set by an operator in accordance with the processing load.

Further, in both the first and second embodiments, by outputting the load ratio T/Tmax or Tw/Tmax to the NC display 12 to display the load ratio on the NC screen, operators can check the allowable difference between the motor temperature and the maximum allowable temperature.

The numerical control devices described as examples above are realized by operating a computer to execute programs, each of which describes processes of each functional module of the device. The computer may have a circuit configuration in which components are connected via, for example, a bus. The components may include, as hardware, a microprocessor such as a CPU, a memory (primary memory) such as a random access memory (RAM) and a read-only memory (ROM), and a HDD controller which controls a hard disk drive (HDD), and as software, various input/output (I/O) interfaces, and a network interface which controls connection with a network such as a local area network. Further, the following components may be connected to the bus via, for example, an I/O interface: a disk drive for reading from and/or writing to a portable disk-type storage media such as a CD and DVD, and a memory reader/writer for reading from and/or writing to a portable non-volatile storage media of various standards such as a flash memory. Programs describing processes of the respective functional modules described above as examples are installed in a computer by storing the programs in a fixed storage device such as a hard disk drive via a storage media such as a CD and DVD or through communications such as via a network. The programs stored in the fixed storage are read to a RAM and executed by a microprocessor such as a CPU, and thereby the functional modules described as examples above are realized.

REFERENCE NUMERALS

1 NC command generator; 2 position controller; 3 speed controller; 4 current controller; 5 inverter circuit; 6 motor; 7 encoder; 8 temperature predictor; 9 temperature comparator; 10 storage; 11 processing program controller; and 12 NC display.

What is claimed is:
1. A numerical control device comprising:
an NC command generator that outputs a positional command by executing a processing program;
a position controller that receives inputs of the positional command and a positional feedback from an encoder sensing a position of a movable element of a motor, obtains a speed command based on the received inputs, and outputs the speed command;
a speed controller that receives inputs of the speed command and a speed feedback from the encoder, obtains a current command based on the received inputs, and outputs the current command;
a current controller that receives inputs of the current command and a current feedback, obtains an inverter drive command based on the received inputs, and outputs the inverter drive command;
an inverter circuit that controls the motor in accordance with the inverter drive command;
a motor temperature sensor that senses a temperature of the motor or calculates a temperature of the motor based on the current command or the current feedback; and
a power supply controller that
calculates a load ratio that is a ratio of the motor temperature sensed or calculated by the motor temperature sensor to a predetermined maximum motor allowable temperature, and
controls to shutdown a power supply to the motor after allowing the NC command generator to execute the processing program to an end of a sequence block or an end of the processing program when the calculated load ratio is over a predetermined threshold.

2. The numerical control device according to claim 1, wherein the threshold is set to a lower value when a time period required for one cycle of the processing program is longer.

3. The numerical control device according to claim 1, further comprising a display that displays the load ratio calculated by the power supply controller.

4. A method comprising:
outputting a positional command by executing a processing program by an NC command generator;
receiving inputs of the positional command and a positional feedback from an encoder sensing a position of a movable element of a motor, obtaining a speed command based on the received inputs, and outputting the speed command;
receiving inputs of the speed command and a speed feedback from the encoder, obtaining a current command based on the received inputs, and outputting the current command;
receiving inputs of the current command and a current feedback, obtaining an inverter drive command based on the received inputs, and outputting the inverter drive command;
controlling the motor in accordance with the inverter drive command;
sensing a temperature of the motor or calculating a temperature of the motor based on the current command or the current feedback; and
calculating a load ratio that is a ratio of the sensed or calculated motor temperature to a predetermined maximum motor allowable temperature, and shutting down a power supply to the motor after allowing the NC command generator to execute the processing program to an end of a sequence block or an end of the processing program when the calculated load ratio is over a predetermined threshold.

5. A numerical control device comprising:
an NC command generator that outputs a positional command by executing a processing program;
a position controller that receives inputs of the positional command and a positional feedback from an encoder sensing a position of a movable element of a motor, obtains a speed command based on the received inputs, and outputs the speed command;
a speed controller that receives inputs of the speed command and a speed feedback from the encoder, obtains a current command based on the received inputs, and outputs the current command;
a current controller that receives inputs of the current command and a current feedback, obtains an inverter drive command based on the received inputs, and outputs the inverter drive command;
an inverter circuit that controls the motor in accordance with the inverter drive command;
a motor temperature sensor that senses a temperature of the motor or calculates a temperature of the motor based on the current command or the current feedback; and
a cut depth controller that
calculates a load ratio that is a ratio of the motor temperature sensed or predicted by the motor temperature sensor to a predetermined maximum motor allowable temperature, and
controls to reduce a cut depth commanded by the processing program when the calculated load ratio is over a predetermined threshold.

6. The numerical control device according to claim 5, wherein the threshold is set to a lower value when a time period required for one cycle of the processing program is longer.

7. The numerical control device according to claim 5, further comprising a display that displays the load ratio calculated by the cut depth controller.

8. A method comprising:
outputting a positional command by executing a processing program by an NC command generator;
receiving inputs of the positional command and a positional feedback from an encoder sensing a position of a movable element of a motor, obtaining a speed command based on the received inputs, and outputting the speed command;
receiving inputs of the speed command and a speed feedback from the encoder, obtaining a current command based on the received inputs, and outputting the current command;
receiving inputs of the current command and a current feedback, obtaining an inverter drive command based on the received inputs, and outputting the inverter drive command;
controlling the motor in accordance with the inverter drive command;
sensing a temperature of the motor or calculating a temperature of the motor based on the current command or the current feedback; and
calculating a load ratio that is a ratio of the sensed or calculated motor temperature to a predetermined maximum motor allowable temperature, and controlling to reduce a cut depth commanded by the processing program when the calculated load ratio is over a predetermined threshold.

* * * * *